United States Patent
Suzuki

(10) Patent No.: US 9,655,052 B2
(45) Date of Patent: *May 16, 2017

(54) STORAGE MEDIUM HAVING STORED COMMUNICATION PROGRAM, INFORMATION PROCESSING APPARATUS, COMMUNICATION SYSTEM, AND COMMUNICATION METHOD

(71) Applicant: NINTENDO CO., LTD., Kyoto (JP)

(72) Inventor: Kazuhiro Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/058,388

(22) Filed: Mar. 2, 2016

(65) Prior Publication Data

US 2016/0183190 A1    Jun. 23, 2016

Related U.S. Application Data

(63) Continuation of application No. 13/937,728, filed on Jul. 9, 2013, now Pat. No. 9,326,244.

(30) Foreign Application Priority Data

Dec. 18, 2012    (JP) .................................. 2012-275927

(51) Int. Cl.
H04W 52/02    (2009.01)
H04B 5/00    (2006.01)
H04W 4/00    (2009.01)

(52) U.S. Cl.
CPC ...... *H04W 52/0241* (2013.01); *H04B 5/0031* (2013.01); *H04W 4/008* (2013.01); *Y02B 60/50* (2013.01)

(58) Field of Classification Search
CPC ................................................ H04W 52/0241
See application file for complete search history.

(56) References Cited

U.S. PATENT DOCUMENTS 5,606,574 A    2/1997 Hasegawa et al.
7,873,351 B2 *    1/2011 Yahagi .................. H04W 48/02
                                                                    455/41.2

(Continued)

FOREIGN PATENT DOCUMENTS

EP    2192810    6/2010
JP    8-021874    1/1996

(Continued)

*Primary Examiner* — Tuan H Nguyen
(74) *Attorney, Agent, or Firm* — Nixon & Vanderhye PC

(57) ABSTRACT

An example of an information processing apparatus has a communication section configured to perform near field communication. The information processing apparatus uses the communication section to perform data communication with a communication target present near the communication section. After the data communication, the information processing apparatus causes the communication section to intermittently transmit radio waves for confirming presence of the communication target having performed the data communication. Based on this, if the communication target is present at a position where the communication target can communicate with the information processing apparatus, the radio waves are temporarily stopped. This makes it possible to reduce the power consumption when near field communication is performed.

14 Claims, 7 Drawing Sheets

(56) References Cited

U.S. PATENT DOCUMENTS

| 8,818,463 B2 | 8/2014 | Kondo et al. |
| 2008/0039212 A1 | 2/2008 | Ahlgren et al. |
| 2012/0231734 A1* | 9/2012 | Symons ............... H04B 5/0075 455/41.1 |

FOREIGN PATENT DOCUMENTS

| JP | 2005-252613 | 9/2005 |
| JP | 2006-253967 | 9/2006 |
| JP | 2012-222788 | 11/2012 |

* cited by examiner

STORAGE MEDIUM HAVING STORED COMMUNICATION PROGRAM, INFORMATION PROCESSING APPARATUS, COMMUNICATION SYSTEM, AND COMMUNICATION METHOD

CROSS-REFERENCE TO RELATED APPLICATION

This application is a continuation of U.S. patent application Ser. No. 13/937,728, filed on Jul. 9, 2013, which claims priority to Japanese Patent Application No. 2012-275927, filed on Dec. 18, 2012. The entire contents of each of these applications are hereby incorporated herein by reference.

TECHNICAL FIELD

The technology relates to a storage medium having stored therein a communication program for performing near field communication with a communication target, and an information processing apparatus, a communication system, and a communication method for performing near field communication with a communication target.

BACKGROUND AND SUMMARY

Conventionally, there is a technique of performing communication between apparatuses, using near field communication such as NFC (Near Field Communication). In near field communication, in accordance with the fact that a communication target, which is another communication apparatus, has come close to a communication apparatus, the communication target is specified, and communication is started.

In conventional near field communication, while a communication target, which is another communication apparatus, is close to a communication apparatus, the communication apparatus continues to transmit radio waves to detect whether or not the communication target has moved away. This leads to large power consumption.

Therefore, the present application discloses a storage medium having stored therein a communication program capable of reducing power consumption in near field communication, and an information processing apparatus, a communication system, and a communication method that are capable of reducing power consumption in near field communication.

(1)

An example of a storage medium according to the present specification is a non-transitory computer-readable storage medium having stored therein a communication program to be executed by a computer of an information processing apparatus having a communication section configured to perform near field communication, the communication program causing the computer to execute performing communication and confirmation. The computer performs data communication with a communication target present near the communication section, using the communication section. After the data communication, the computer causes the communication section to intermittently transmit radio waves for confirming presence of the communication target having performed the data communication.

(2)

The communication program may further cause the computer to execute, if the presence of the communication target near the communication section has been confirmed, acquiring identification information of the communication target from the communication target, and determining, using the acquired identification information, whether or not the communication target having performed the data communication has been changed.

(3)

While a result of the determination is negative, the radio waves for confirming the presence of the communication target having performed the data communication may continue to be intermittently transmitted.

(4)

The communication program may further cause the computer to execute, if a result of the determination is affirmative, notifying an application executed by the information processing apparatus that the communication target having performed the data communication has been changed.

(5)

In response to the fact that the data communication between the information processing apparatus and the communication target present near the communication section has ended, radio waves for the data communication may be temporarily stopped regardless of whether or not the communication target having performed the data communication is present at a position where the communication target can communicate with the information processing apparatus.

(6)

After the radio waves for the data communication have been temporarily stopped, the communication section may intermittently transmit the radio waves for confirming the presence of the communication target having performed the data communication.

(7)

As the data communication, data may be read from and/or written to the communication target present near the communication section. After the reading and/or the writing of the data has ended, an operation of intermittently transmitting the radio waves may be started.

(8)

In accordance with an instruction from an application executed by the information processing apparatus, data communication with the communication target present near the communication section may be performed. An operation of intermittently transmitting the radio waves may be started regardless of the instruction from the application.

(9)

If the instruction has been given by the application during the operation of intermittently transmitting the radio waves, the transmission operation may be stopped. In response to the stoppage of the transmission operation and in accordance with the instruction from the application, the data communication may be performed anew with the communication target having performed the data communication.

(10)

The communication program may further cause the computer to execute, if the presence of the communication target has not been confirmed, notifying the application that the communication target has disappeared.

(11)

The application may not be notified of connection and disconnection of communication caused by the operation of intermittently transmitting the radio waves.

(12)

The communication program may further cause the computer to execute sensing the presence or absence of the communication target present near the communication section at first time intervals, using the radio waves. In this case, if the communication target has been sensed, data communication may be performed with the sensed communication target. The communication section may transmit the radio waves at second time intervals different from the first time intervals after the data communication.

(13)

Another example of a storage medium according to the present specification is a non-transitory computer-readable storage medium having stored therein a communication program to be executed by a computer of an information processing apparatus having a communication section configured to perform near field communication, the communication program causing the computer to execute performing communication and confirmation. In accordance with an instruction from an application executed by the information processing apparatus, the computer performs data communication with a communication target present near the communication section, using the communication section. By causing the communication section to intermittently transmit radio waves regardless of the instruction from the application, the computer confirms that the communication target having performed the data communication is present at a position where the communication target can communicate with the information processing apparatus.

It should be noted that the present specification discloses an information processing apparatus including functions equivalent to those of the information processing apparatus according to the above configurations (1) through (13), and discloses a communication system including the communication target and the information processing apparatus according to the above configurations (1) through (13). Further, the present specification discloses a communication method to be performed by the information processing apparatus according to the above configurations (1) through (13).

These and other objects, features, aspects and advantages of the exemplary embodiments will become more apparent from the following detailed description of the exemplary embodiments when taken in conjunction with the accompanying drawings.

DETAILED DESCRIPTION OF EXEMPLARY EMBODIMENTS

[1. Configuration of Communication System]

Figure 1:
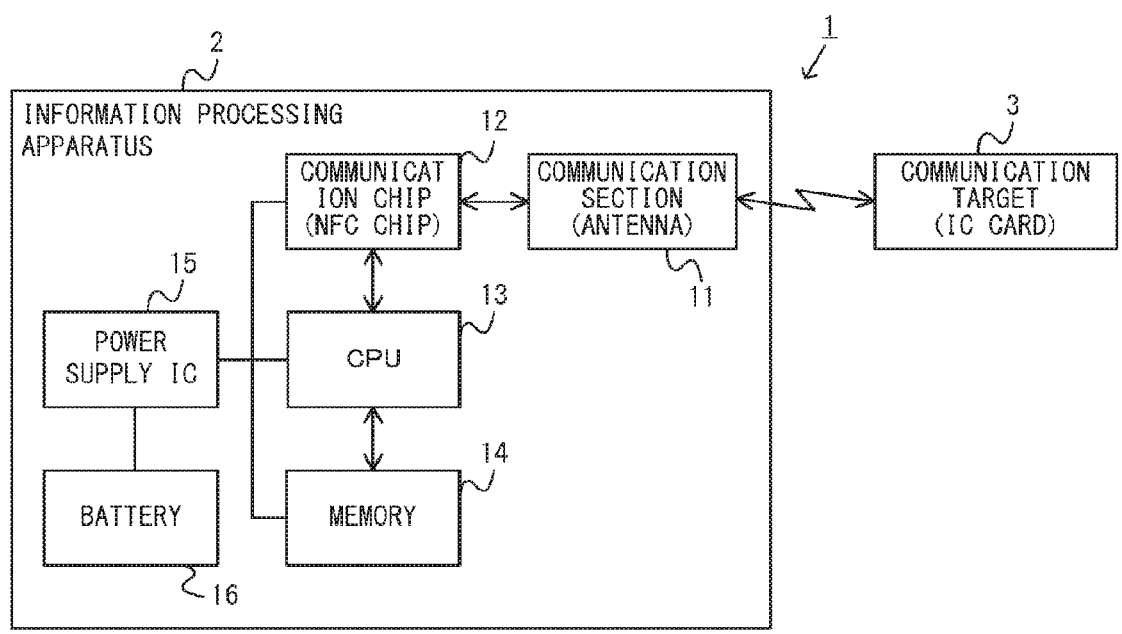
FIG. 1 is a diagram showing a non-limiting example of the configuration of a communication system according to an exemplary embodiment.

A description is given below of a communication program, an information processing apparatus, a communication system, and a communication method according to an exemplary embodiment. First, the configuration of the communication system is described. FIG. 1 is a diagram showing an example of the configuration of the communication system according to the exemplary embodiment. As shown in FIG. 1, a communication system 1 includes an information processing apparatus 2 and a communication target 3. The information processing apparatus 2 may be any information processing apparatus capable of performing near field communication with the communication target 3.

In the exemplary embodiment, a description is given taking as an example the case where, as exemplary near field communication, communication based on the NFC standard is performed between the information processing apparatus 2 and the communication target 3. Here, "near field communication" as used herein refers to a communication method where radio waves from an apparatus develop an electromotive force (for example, by electromagnetic induction) in another apparatus. The other apparatus can operate by the developed electromotive force (the other apparatus may or may not have a power supply). In near field communication, when the information processing apparatus 2 and the communication target 3 have come close to each other (typically, the distance between the information processing apparatus 2 and the communication target 3 has become dozen centimeters or less), the information processing apparatus 2 and the communication target 3 become capable of communicating with each other. Near field communication in the exemplary embodiment is a communication method also referred to as "contactless communication". Further, in conventional general near field communication, radio waves continue to be transmitted while the communication between two communication apparatuses is established (a communication target, which is another communication apparatus, is close to a communication apparatus).

The information processing apparatus 2 may be any information processing apparatus capable of performing near field communication. In the exemplary embodiment, the information processing apparatus 2 is a handheld (or portable) apparatus such as a handheld game apparatus, a mobile phone, or a smartphone. For example, the information processing apparatus 2 is a portable device having the function of an NFC reader/writer.

The communication target 3 may be any apparatus capable of performing near field communication with the information processing apparatus 2. In the exemplary embodiment, the communication target 3 is a storage medium (for example, an IC card) having the function of an NFC tag. The description is given below taking as an example the case where the communication target 3 is an IC card. The communication target 3, however, is not limited to a storage medium such as an IC card, and may be, for example, an information processing apparatus (a portable device) having an NFC card emulation function.

The configuration of the information processing apparatus 2 is described below. As shown in FIG. 1, the information processing apparatus 2 includes a communication section 11. The communication section 11 is an antenna used for near field communication. Further, the information processing apparatus 2 includes a communication chip 12. In accordance with an instruction from a CPU 13 described later, the communication chip 12 generates a signal (radio waves) to be transmitted from the communication section 11. The generated signal is transmitted from the communication section 11. The communication chip 12 is, for example, an NFC chip. It should be noted that in another embodiment, a communication module (for example, an NFC module) having the functions of the communication section 11 and the communication chip 12 may be connected (attached) to the information processing apparatus 2. The communication module may be configured to be attachable to and detachable from the information processing apparatus 2.

As shown in FIG. 1, the information processing apparatus 2 includes a CPU 13 and a memory 14. The CPU 13 is an information processing section for performing various types of information processing performed by the information processing apparatus 2. The CPU 13 performs the various types of information processing using the memory 14.

It should be noted that the information processing apparatus 2 may include a plurality of apparatuses. For example, in another embodiment, a plurality of apparatuses capable of communicating with each other via a network (a wide-area network and/or a local network) may perform in a dispersed manner at least part of the information processing performed by the information processing apparatus 2. Alternatively, for example, the information processing apparatus 2 may be configured such that an apparatus including the communication section 11 and the communication chip 12 is detachably attached to an apparatus including the CPU 13 and the memory 14.

Figure 6:
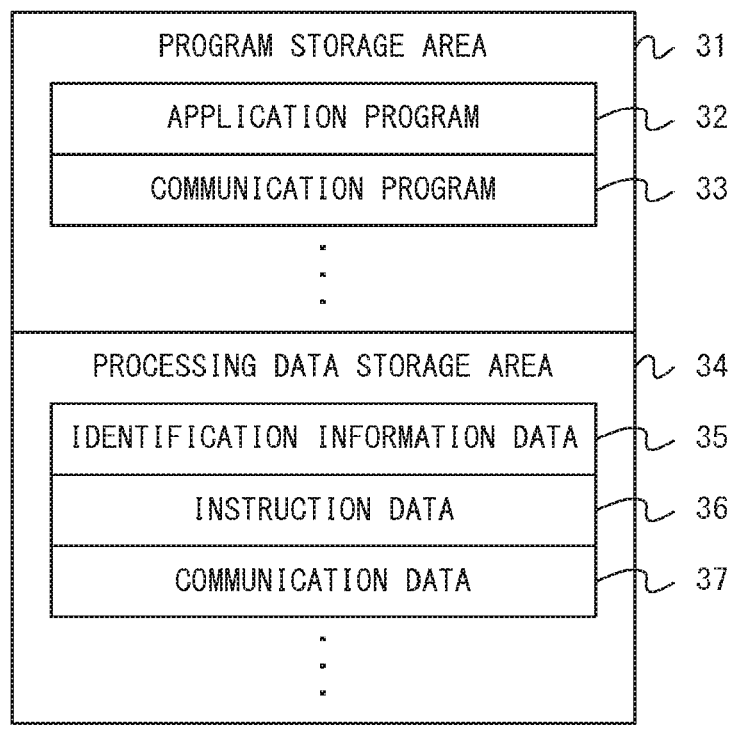
FIG. 6 is a diagram showing a non-limiting example of a data area set in a memory of an information processing apparatus.

In the exemplary embodiment, in the information processing apparatus 2, the CPU 13 executes at least two types of programs, namely an application program and a communication program (see FIG. 6). The application program may be a program for executing any application for performing data communication with the communication target (IC card) 3. The application program may be, for example, a game program for reading game data from the IC card 3 and performing game processing using the game data. The communication program is a program for performing near field communication with the IC card 3. For example, the communication program is firmware for causing the communication chip 12 to operate. Although described in detail later, the communication program receives an instruction from an application and causes the communication chip 12 to perform an operation for communication. It should be noted that if the information processing apparatus 2 can execute a plurality of application programs, the communication program is used in all the applications in a shared manner. That is, the communication program (a communication control section described later) can receive instructions regarding communication from the plurality of applications.

As shown in FIG. 1, the information processing apparatus 2 includes a battery 16 and a power supply IC 15. The power supply IC 15 supplies power from the battery 16 to components of the information processing apparatus 2. In the exemplary embodiment, the power supply IC 15 supplies power to at least the communication chip 12, the CPU 13, and the memory 14. Thus, a reduction in the power consumption of the communication chip 12, the CPU 13, and the memory 14 when near field communication is performed makes it possible to reduce the power consumption of the battery 16.

[2. Overview of Operation of Communication System]
(2-1: Flow of Operation)

Figure 2:
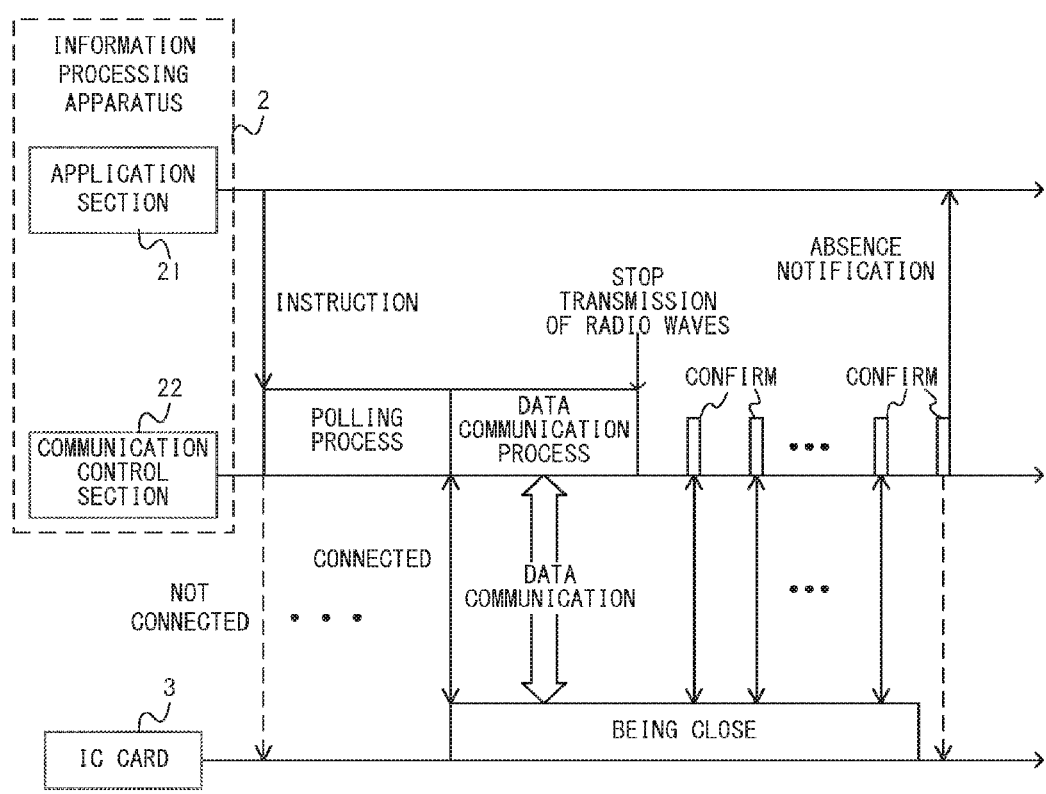
FIG. 2 is a diagram showing a non-limiting example of the operation of the communication system.

Next, with reference to FIGS. 2 through 5, the operation of the communication system 1 regarding communication is described. FIG. 2 is a diagram showing an example of the operation of the communication system 1. It should be noted that as shown in FIG. 2, in the exemplary embodiment, the operation of the information processing apparatus 2 is described by separating an application section 21 and a communication control section 22 on the basis of their functions. In the exemplary embodiment, the application section 21 is the CPU 13 that executes the application program described above. The communication control section 22 is achieved by the CPU 13 that executes the communication program, the communication chip 12, and the communication section 11. It should be noted that in another embodiment, the information processing performed by the information processing apparatus 2 may not need to be achieved by two types of programs, namely the application program and the communication program, and may be achieved by a single program.

As shown in FIG. 2, first, the application section 21 outputs to the communication control section 22 an instruction regarding near field communication. The instruction may include any specific content. For example, the application section 21 outputs to the communication control section 22 an instruction to read and/or write data from and/or to the IC card 3.

When having received the instruction, the communication control section 22 detects the presence or absence of the IC card 3 present near the information processing apparatus 2 (more specifically, the communication section 11). Specifically, the communication control section 22 performs a polling process. That is, the communication control section 22 uses the communication section 11 to transmit radio waves (a polling signal (or a polling command)) for confirming the presence of the IC card 3.

As a result of the polling process described above, if the IC card 3 present near the communication section 11 has not been sensed, the communication control section 22 repeatedly performs the polling process. It should be noted that if the IC card 3 has not been sensed even by repeating the polling process for a predetermined time or longer, the communication control section 22 may notify the application section 21 that the IC card 3 has not been sensed.

If, on the other hand, the IC card 3 has been brought close to the communication section 11 by a user or the like, the IC card 3 is sensed by the polling process, and communication (connection) is established. That is, if the IC card 3 has been sensed, the communication control section 22 performs the process of establishing communication (for example, the process of acquiring information necessary for data communication from the IC card 3). Then, as shown in FIG. 2, the communication control section 22 uses the communication section 11 to communicate with the IC card 3. Specifically, the communication control section 22 performs a data communication process. The data communication process is the process of transmitting and/or receiving data (to be used in an application) to and/or from the IC card 3. The data communication process is a communication process different from the polling process or the process of establishing communication, and is, for example, a data reading process and a data writing process. Here, the data communication process is performed in accordance with the above instruction from the application section 21. Any specific operation may be performed in the data communication process, and may be an operation similar to a conventional operation.

When the data communication process has ended, the communication control section 22 causes the communication section 11 to intermittently transmit radio waves, thereby confirming that the communication target (IC card) 3 is present (continues to be present) at a position where the communication target 3 can communicate with the information processing apparatus 2. Specifically, when the data communication process has ended, the communication control section 22 temporarily stops the transmission of radio waves for near field communication. Then, the communication control section 22 performs a confirmation operation, for example, at certain time intervals (see FIG. 2). The confirmation operation includes the operation of transmitting radio waves for confirming the presence of the IC card 3. Specifically, these radio waves may be the same as those used in the polling process (the polling signal) described above. That is, the confirmation operation may be the same as the polling process. As described above, after temporarily stopping radio waves for data communication, the communication control section 22 intermittently transmits radio waves for confirming the presence of the IC card 3 (having performed the data communication).

The communication control section 22 performs information processing based on the result of the confirmation operation. The processing based on the confirmation result is performed, thereby enabling the information processing apparatus 2 to provide an appropriate response based on whether or not the communication target 3 is present. Specifically, if the presence of the IC card 3 (the fact that the IC card 3 continues to be present) has been confirmed by the confirmation operation, the communication control section 22 repeats the confirmation operation. It should be noted that in this case, in the exemplary embodiment, the communication control section 22 does not notify the application section 21 of the result of the confirmation operation (details will be described in "2-5: Notification to Application"). If, on the other hand, the IC card 3 has been moved away from the communication section 11, the presence of the IC card 3 is not confirmed. If the presence of the IC card 3 is not confirmed, the communication control section 22 notifies the application section 21 that the IC card 3 is not present (an absence notification) (see FIG. 2). It should be noted that any processing may be performed by the application section 21 when having received the absence notification. For example, the application section 21 may end the processing regarding near field communication, or may give the communication control section 22 an instruction to detect the communication target 3 again.

In addition, although not shown in the figures, in the exemplary embodiment, the intermittent confirmation operation is stopped in accordance with the fact that an instruction to stop has been given by the application section 21. At this time, the communication control section 22 stops the transmission of radio waves and ends the communication with the IC card 3.

Based on the above operation, the information processing apparatus 2 can determine whether or not the IC card 3 continues to be present at a position where the IC card 3 can communicate with the information processing apparatus 2. This makes it possible to deal not only with the form of use in which the IC card 3 comes close to the information processing apparatus 2 only for a short period, but also with the form of use in which the IC card 3 continues to be present near the information processing apparatus 2. That is, in the exemplary embodiment, the information processing apparatus 2 can perform information processing based on whether or not the IC card 3 is present, or can perform information processing under the condition that the IC card 3 is present. For example, in a game application, the information processing apparatus 2 can perform information processing of causing a particular game character to appear in a game space while a predetermined IC card 3 is present.

As described above, in the exemplary embodiment, the information processing apparatus 2 (the communication control section 22) uses the communication section 11 to perform data communication (the data communication process shown in FIG. 2) with the communication target (IC card) 3 present near the communication section 11. Further, after the data communication, the information processing apparatus 2 (the communication control section 22) causes the communication section 11 to intermittently transmit radio waves for confirming the presence of the communication target 3 having performed the data communication. Based on the exemplary embodiment, the confirmation operation (the transmission of radio waves) is intermittently performed. Thus, even when the communication target (IC card) 3 is actually present at a position where the communication target 3 can communicate with the information processing apparatus 2, there is a period in which the communication section 11 stops the transmission of radio waves (see FIG. 2). That is, the communication section 11 does not continue to transmit radio waves during the period in which the communication target (IC card) 3 is present at a position where the communication target 3 can communicate with the information processing apparatus 2, but temporarily stops radio waves during this period. This makes it possible to reduce the power consumption when near field communication is performed. Further, when the information processing apparatus 2 is a portable device having the built-in battery 16 as in the exemplary embodiment, it is possible to reduce the power consumption of the battery 16 to increase the operating time of the portable device.

In addition, as described above, in the exemplary embodiment, in accordance with the fact that predetermined data communication (the data communication process) between the information processing apparatus 2 and the IC card 3 has ended, the information processing apparatus 2 (the communication control section 22) temporarily stops radio waves for communication (see FIG. 2). This temporary stoppage of radio waves is performed regardless of whether or not the IC card 3 is present at a position where the IC card 3 can communicate with the information processing apparatus 2 (i.e., even when the IC card 3 is present at a position where the IC card 3 can communicate with the information processing apparatus 2). Thus, it is possible to certainly perform data communication, and also reduce the power consumption when the IC card 3 continues to be present after that.

In addition, as described above, in the exemplary embodiment, the information processing apparatus 2 (the communication control section 22) performs data communication with the IC card 3 in accordance with an instruction from an application executed by the information processing apparatus 2. Further, the information processing apparatus 2 (the communication control section 22) starts the operation of intermittently transmitting radio waves regardless of the instruction from the application. That is, the communication control section 22 voluntarily starts the confirmation operation, not in accordance with an instruction from the application. This eliminates the need for the application to manage the confirmation operation. This facilitates the development and the creation of an application.

(2-2: Determination of Change of Communication Target in Confirmation Operation)

As described above, in the exemplary embodiment, if the IC card 3 is present at a position where the IC card 3 can communicate with the information processing apparatus 2, a confirmation operation is intermittently performed. The confirmation operation according to the exemplary embodiment is described in detail below. Here, when the confirmation operation is intermittently performed as in the exemplary embodiment, the communication target (IC card) 3 may be changed, that is, the IC card 3 may be replaced by another IC card, during the period from the performance of the confirmation operation to the next performance of the confirmation operation. In response, in the exemplary embodiment, in the confirmation operation, it is determined whether or not the communication target (IC card) 3 has been changed.

Figure 3:
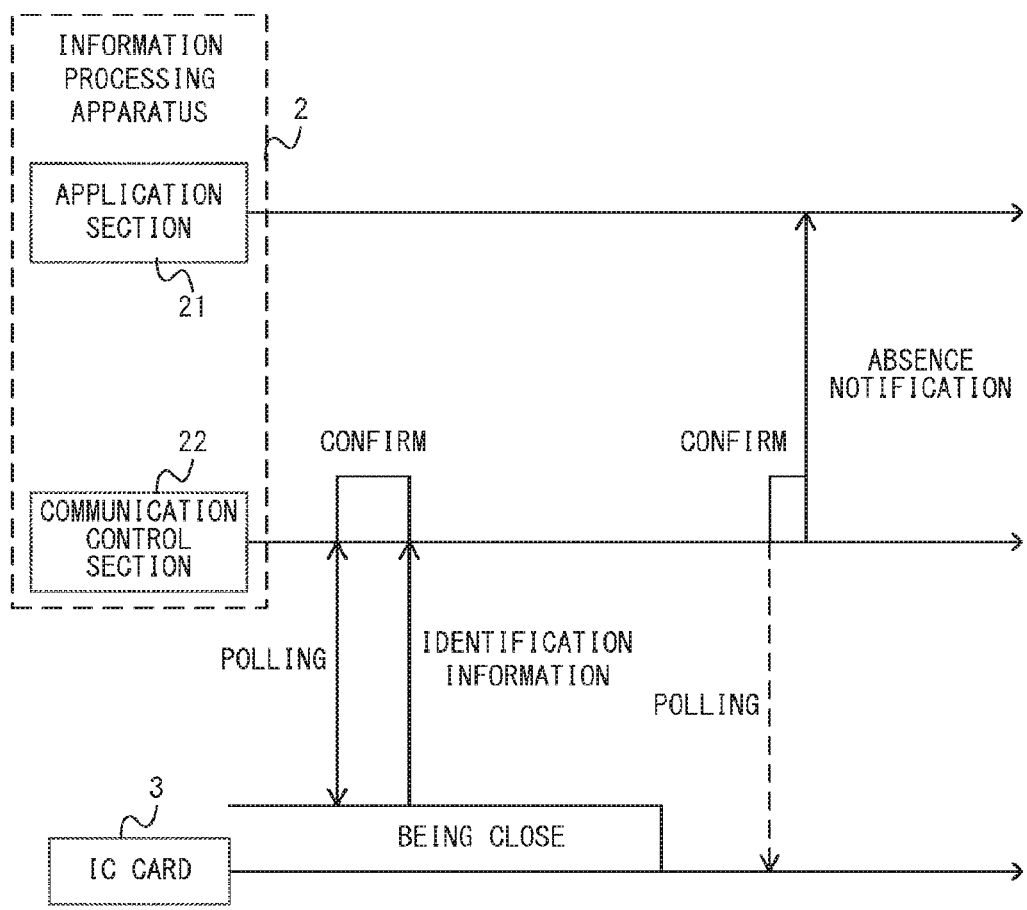
FIG. 3 is a diagram showing non-limiting examples of details of a confirmation operation shown in FIG. 2.

FIG. 3 is a diagram showing examples of details of the confirmation operation shown in FIG. 2. As shown in FIG. 3, in the confirmation operation, the communication control section 22 performs the operation of transmitting radio waves for confirming the presence of the IC card 3 (an operation similar to the polling process in the exemplary embodiment). That is, the communication control section 22 confirms that the IC card 3 is present at a position where the IC card 3 can communicate with the information processing apparatus 2 (determines whether or not the IC card 3 is present at a position where the IC card 3 can communicate with the information processing apparatus 2). If the presence of the IC card 3 has not been confirmed, the communication control section 22 notifies the application section 21 that the IC card 3 is not present (an absence notification) (see FIG. 3). In this case, a determination process using identification information described later is not performed.

In addition, if the presence of the IC card 3 has been confirmed, the communication control section 22 acquires identification information of the IC card 3 from the IC card 3 (see FIG. 3). It should be noted that the identification information of the communication target (IC card) 3 may be any information capable of identifying an individual communication target (IC card) 3. In the exemplary embodiment, the identification information is an UID (Unique ID) in NFC.

The communication control section 22 determines, using the acquired identification information, whether or not the IC card 3 has been changed. The determination may be made by any specific method. In the exemplary embodiment, the communication control section 22 compares the acquired identification information with the identification information saved in the memory 14. If the two pieces of identification information match each other, it is determined that the IC card 3 has not been changed. If the two pieces of identification information do not match each other, it is determined that the IC card 3 has been changed. It should be noted that the identification information saved in the memory 14 may be acquired in the data communication process performed before the confirmation operation, or may be acquired in the previous confirmation operation.

Figure 4:
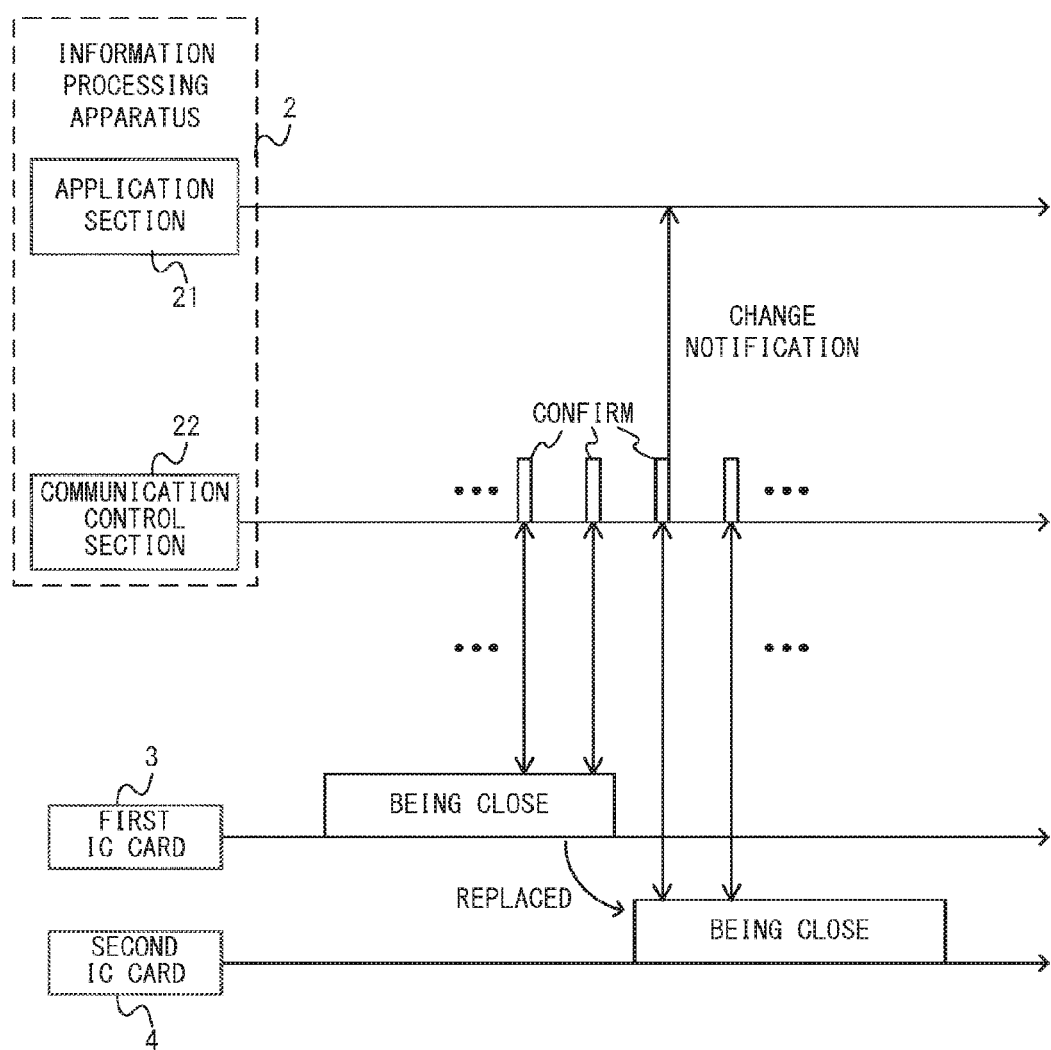
FIG. 4 is a diagram showing a non-limiting example of the operation of the communication system in the case where a communication target is changed.

FIG. 4 is a diagram showing an example of the operation of the communication system in the case where the IC card 3 is changed. It should be noted that, to make the figure readily understandable, unlike FIG. 3, FIG. 4 does not show the details of the confirmation operation. In FIG. 4, the case is considered where a first IC card 3 is first present at a position where the first IC card 3 can communicate with the information processing apparatus 2, and is thereafter replaced by a second IC card 4.

As shown in FIG. 4, in the state where the first IC card 3 is present, the acquired identification information indicates the first IC card 3. Thus, it is determined that the communication target (IC card) has not been changed. As shown in FIG. 4, while the IC card is not changed (while the result of the determination is negative), the intermittent transmission of radio waves is continued. This results in certainly performing the confirmation operation. If, on the other hand, the first IC card 3 has been replaced by the second IC card 4 during the period from the performance of the confirmation operation to the next performance of the confirmation operation, the acquired identification information indicates the second IC card 4. Thus, it is determined that the communication target has been changed. In this case (if the result of the determination is affirmative), the communication control section 22 notifies the application section 21 that the communication target has been changed (a change notification) (see FIG. 4). This enables the application to accurately recognize the change of the IC card.

It should be noted that any processing may be performed by the application section 21 when having received the change notification. For example, the application section 21 may end the processing regarding near field communication, or may give the communication control section 22 an instruction to perform data communication with the newly sensed second IC card 4.

As described above, in the exemplary embodiment, in the confirmation operation, the information processing apparatus 2 (the communication control section 22) determines, using the identification information acquired from the IC card 3, whether or not the communication target (IC card) 3 has been changed. This makes it possible to determine whether or not the IC card 3 has been changed during the period from the performance of the confirmation operation to the next performance of the confirmation operation, and therefore to accurately confirm that the IC card 3 continues to be present at a position where the IC card 3 can communicate with the information processing apparatus 2. Further, for example, it is possible to prevent dishonesty committed by changing the IC card.

It should be noted that in another embodiment, the information processing apparatus 2 may not need to acquire identification information from the IC card 3 in the confirmation operation, or may not need to make the determination using the acquired identification information. If the determination using the identification information is not made, for example, the shortening of the time intervals at which the confirmation operation is performed (for example, to intervals of several hundred milliseconds) makes it possible to reduce the possibility of a malfunction due to the fact that the change of the IC card 3 is not detected.

In addition, in the confirmation operation, the communication control section 22 may determine whether or not data has been rewritten to the IC card 3. Specifically, if data has been rewritten to the IC card 3, the information processing apparatus 2 writes, to the IC card 3, information indicating that data has been rewritten (rewriting information). The rewriting information may be, for example, a counter indicating the number of rewrites. In this case, in the confirmation operation, the communication control section 22 acquires the rewriting information from the IC card 3. Then, the communication control section 22 determines, using the acquired rewriting information, whether or not data has been rewritten to the IC card 3. The determination may be performed by any specific method. For example, similarly to the above determination using the identification information, the communication control section 22 may compare the acquired rewriting information with the rewriting information saved in the memory 14.

Here, during the period from the performance of the confirmation operation to the next performance of the confirmation operation, data in the IC card 3 may be rewritten. That is, the IC card 3 may be moved away once from a position where the IC card 3 can communicate with the information processing apparatus 2 and data may be rewritten by another communication apparatus, and thereafter, the IC card 3 may be placed again at a position where the IC card 3 can communicate with the information processing apparatus 2. In response, as described above, it is determined whether or not data has been rewritten, whereby it is possible to reduce the possibility of a malfunction due to the fact that the rewriting of data is not detected by the information processing apparatus 2.

(2-3: Intervals of Confirmation Operation)

Each of the time intervals at which the confirmation operation is intermittently performed may be any length. In the exemplary embodiment, each of the time intervals at which the confirmation operation is performed may be set to a length different from each of the time intervals at which the polling process (see FIG. 2) is performed before the data communication process. That is, if performing the polling process at first time intervals, the information processing apparatus 2 (the communication control section 22) causes the communication section 11 to transmit the radio waves described above at second time intervals, which are different from the first time intervals. It should be noted that in another embodiment, each of the first time intervals and each of the second time intervals may be set to the same length.

Each of the second time intervals may be set to be longer than each of the first time intervals, or may be set to be shorter than each of the first time intervals. For example, each of the second time intervals may be set to be shorter than each of the first time intervals, whereby it is possible to reduce the possibility that, as described above, a malfunction occurs because the change of the communication target (IC card) 3 is not detected. Further, each of the second time intervals may be set to be shorter than each of the first time intervals, whereby it is also possible to reduce the possibility of a malfunction, as described above, due to the fact that the rewriting of data to the IC card 3 is not detected by the information processing apparatus 2. That is, each of the second time intervals may be set to be shorter, whereby it is possible to reduce the possibility of a malfunction without even making the determination using the identification information, or making the determination using the writing information.

In addition, for example, each of the second time intervals may be set to be longer than each of the first time intervals, thereby increasing the effect of reducing the power consumption. For example, if the determination using the identification information and/or the determination using the writing information are made in the confirmation operation, it is possible to sense the replacement of the IC card 3 and the rewriting of data. Thus, each of the second time intervals may be set to be longer than each of the first time intervals.

(2-4: Restart of Communication Process)

In the exemplary embodiment, if a new instruction has been given by the application section 21 while the confirmation operation is intermittently performed, the communication control section 22 performs a data communication process based on the new instruction. Thus, if the IC card 3 continues to be present after the information processing apparatus 2 has ended a data communication process with the IC card 3, the information processing apparatus 2 can start a new data communication process. The details are described below.

Figure 5:
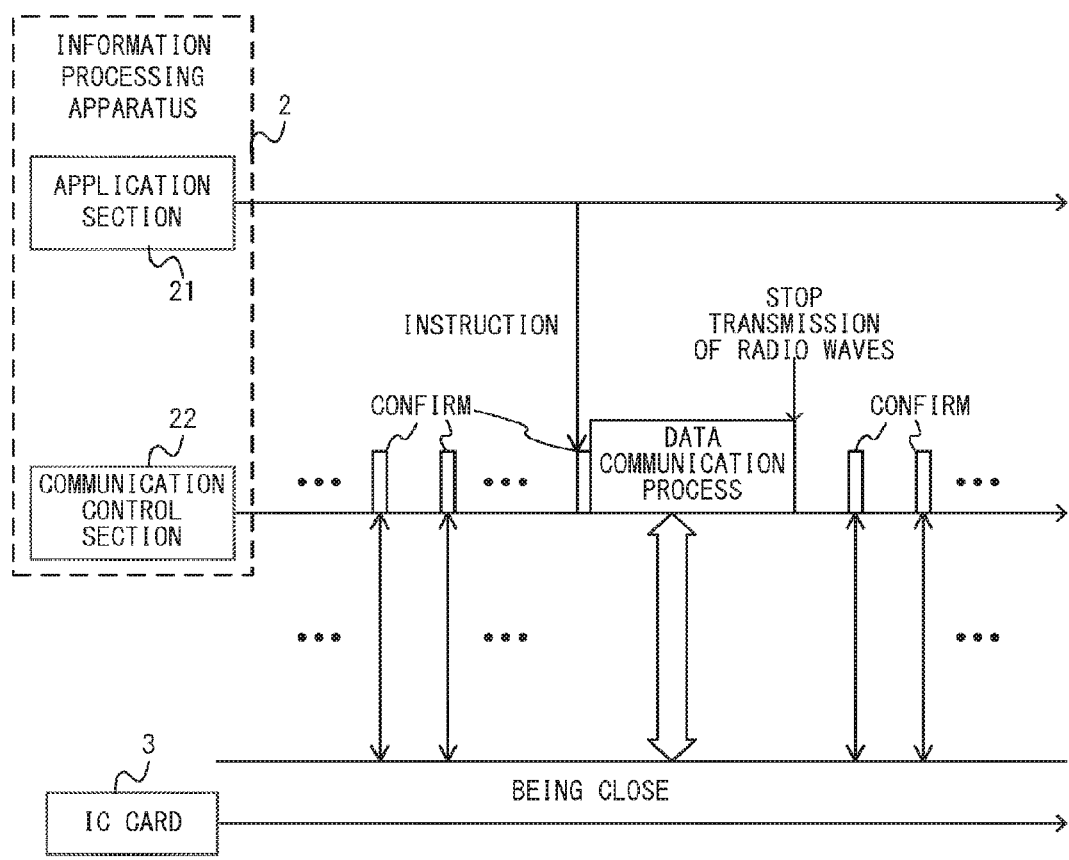
FIG. 5 is a diagram showing a non-limiting example of the operation of the communication system in the case where a new instruction is given by an application section.

FIG. 5 is a diagram showing an example of the operation of the communication system in the case where a new instruction is given by the application section 21. As shown in FIG. 5, if a new instruction has been given by the application section 21 while the confirmation operation is intermittently performed, the communication control section 22 first performs a confirmation operation. Here, the confirmation operation performed in accordance with the fact that an instruction has been given (hereinafter referred to as a "post-instruction confirmation operation") may be performed after a certain time has elapsed since the previous confirmation operation, or may be performed immediately after the instruction has been given (performed without waiting). Further, in the exemplary embodiment, the post-instruction confirmation operation is similar to the confirmation operation described above (see FIG. 3). That is, in the post-instruction confirmation operation, the operation of transmitting radio waves for confirming the presence of the IC card 3 and the determination operation using the identification information acquired from the IC card 3 are performed.

In the post-instruction confirmation operation, if it has been confirmed that the IC card 3 is present at a position where the IC card 3 can communicate with the information processing apparatus 2, the communication control section 22 performs a data communication process in accordance with an instruction from the application section 21 (see FIG. 5). Thus, the intermittent confirmation operation is stopped. It should be noted that in near field communication, communication is disconnected by stopping the transmission of radio waves. Thus, the communication control section 22 may perform the process of establishing communication, where necessary, before performing the data communication process. The operation performed during the period from when a new instruction has been given to when the data communication process is performed may be similar to the operation performed when an instruction has first been given by the application section 21.

It should be noted that in the post-instruction confirmation operation, if it has not been confirmed that the IC card 3 is present at a position where the IC card 3 can communicate with the information processing apparatus 2, the communication control section 22 gives the application section 21 the absence notification described above. Further, in the post-instruction confirmation operation, if it has been determined that the IC card 3 has been changed, the communication control section 22 gives the application section 21 the change notification described above.

When the data communication process based on the new instruction has ended, the communication control section 22 restarts the intermittent confirmation operation. That is, when the data communication process has ended, radio waves are temporarily stopped, and thereafter, radio waves are intermittently transmitted (see FIG. 5).

As described above, if an instruction has been given by the application during the operation of intermittently transmitting radio waves for confirming the presence of the IC card 3, the communication control section 22 stops the transmission operation. Further, in this case, the communication control section 22 communicates (performs a data communication process) with the IC card 3 in accordance with the instruction. Thus, in the exemplary embodiment, even when communication has been (temporarily) disconnected by intermittently performing a confirmation operation, if it is necessary to perform data communication anew, the information processing apparatus 2 can quickly start the data communication.

(2-5: Notification to Application)

As described above, in the exemplary embodiment, if it has not been confirmed that the IC card 3 is present at a position where the IC card 3 can communicate with the information processing apparatus 2, the communication control section 22 gives the application the absence notification described above. This enables the information processing apparatus 2 (the application section 21) to recognize that the IC card 3 has disappeared, and therefore to perform appropriate processing based on the recognition.

In addition, in the exemplary embodiment, the communication control section 22 does not notify the application of the connection and disconnection of communication caused by the operation of intermittently transmitting radio waves as described above. That is, if it has been confirmed that the IC card 3 is present at a position where the IC card 3 can communicate with the information processing apparatus 2, the communication control section 22 does not notify the application section 21 of the result of the confirmation operation. That is, in the exemplary embodiment, in practice, the communication between the information processing apparatus 2 and the IC card 3 is disconnected every time the confirmation operation is performed by intermittently transmitting radio waves. The application, however, is not notified of the disconnection. Thus, without taking into account the communication state (whether or not communication is established), the application section 21 can perform processing, considering that communication is established (the IC card 3 continues to be present) until the absence notification is given. This eliminates the need for the application to take into account the operation to be performed when communication has been disconnected or connected by the intermittent confirmation operation. This facilitates the creation and the development of an application.

It should be noted that in another embodiment, if the presence of the IC card 3 has not been confirmed, the application may not be notified of the result of the confirmation operation, and if the presence of the IC card 3 has been confirmed, the application may be notified of the result of the confirmation operation. In this case, if a notification is not given for a predetermined period, the application section 21 may determine that the IC card 3 has disappeared. Further, in another embodiment, either when the presence of the IC card 3 has been confirmed or when the presence of the IC card 3 has not been confirmed, the communication control section 22 may notify the application section 21 of the result of the confirmation operation. In this case, the application section 21 may perform information processing based on the result of the confirmation operation.

[3. Details of Information Processing Performed by Communication System]

(3-1: Data Used in Information Processing)

Figure 7:
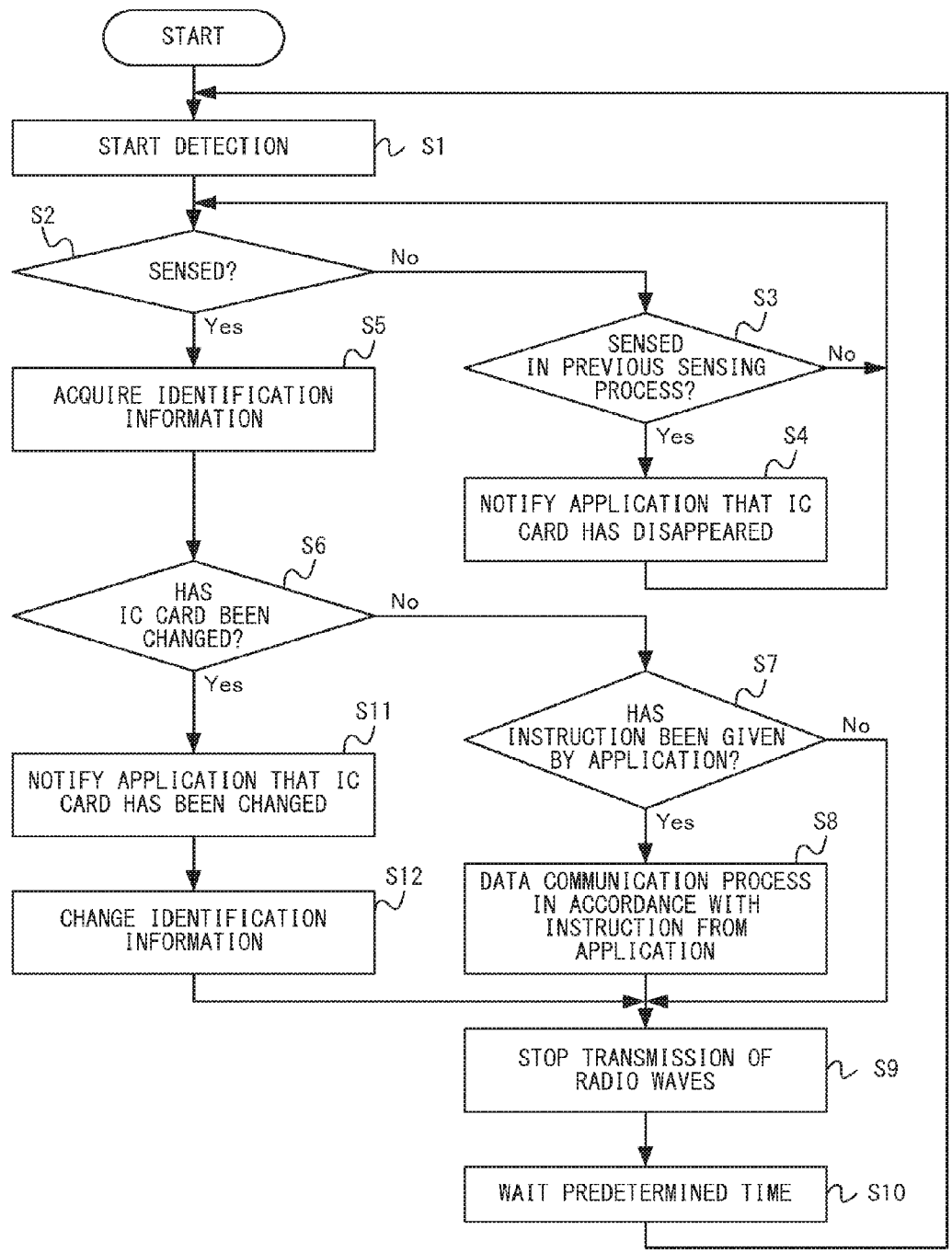
FIG. 7 is a flow chart showing a non-limiting example of the flow of the information processing performed by the information processing apparatus.

With reference to FIGS. 6 and 7, a description is given below of an example of specific processing performed by the communication system 1 (the information processing apparatus 2) in the exemplary embodiment. FIG. 6 is a diagram showing an example of a data area set in the memory 14 of the information processing apparatus 2 in the exemplary embodiment. As shown in FIG. 6, the memory 14 of the information processing apparatus 2 has a program storage area 31 and a processing data storage area 34. It should be noted that the memory 14 stores, as well as data shown in FIG. 6, data of an image to be output to a display section (not shown), data of an image used to generate the image to be output, and the like.

In the program storage area 31, various programs to be executed by the information processing apparatus 2 are stored. In the exemplary embodiment, in the program storage area 31, the application program 32 and the communication program 33 described above are stored. It should be noted that FIG. 6 shows only one type of application program. Alternatively, the information processing apparatus 2 may store a plurality of types of application programs. It should be noted that the application program 32 (the communication program 33 likewise) may be stored in advance in a storage device in the information processing apparatus 2, or may be acquired from a storage medium attachable to and detachable from the information processing apparatus 2 and stored in the memory 14, or may be acquired from another apparatus via a network such as the Internet and stored in the memory 14. The CPU 13 executes a program (the application program 32 and/or the communication program 33) stored in the memory 14.

In the processing data storage area 34, various types of data to be used in the information processing performed by the information processing apparatus 2 (information processing shown in FIG. 7) are stored. In the exemplary embodiment, in the processing data storage area 34, at least identification information data 35, instruction data 36, and communication data 37 are stored. The identification information data 35 is data indicating the identification information described above, acquired from the IC card 3. The instruction data 36 is data indicating an instruction (an instruction content) from an application. The communication data 37 is data transmitted to and received from the IC card 3 by the data communication process described above. For example, data read from the IC card 3 and data to be written to the IC card 3 are stored as the communication data 37 in the memory 14.

(3-2: Specific Example of Information Processing)

Next, the detailed flow of the information processing according to the exemplary embodiment is described. FIG. 7 is a flow chart showing an example of the flow of the information processing performed by the information processing apparatus 2 (the CPU 13) in the exemplary embodiment. In the exemplary embodiment, a series of processes shown in FIG. 7 are performed by the CPU 13 executing the communication program 33. Further, the information processing shown in FIG. 7 may be started at any timing. In the exemplary embodiment, the information processing shown in FIG. 7 is started in accordance with the fact that an instruction (regarding near field communication) has been given by an application. At this time, data indicating the instruction is stored as the instruction data 36 in the memory 14.

It should be noted that the processes of all the steps in the flow chart shown in FIG. 7 are merely illustrative. Thus, the processing order of the steps may be changed, or another process may be performed in addition to (or instead of) the processes of all the steps, so long as similar results are obtained. Further, in the exemplary embodiment, descriptions are given on the assumption that the CPU 13 performs the processes of all the steps in the flow chart. Alternatively, a processor or a dedicated circuit other than the CPU 13 may perform the processes of some of the steps in the flow chart.

In the exemplary embodiment, first, in step S1, the CPU 13 starts detecting the IC card 3 present near the communication section 11. That is, the CPU 13 starts transmitting radio waves for confirming the presence of the IC card 3.

In step S2, the CPU 13 determines whether or not the IC card 3 has been sensed. That is, the CPU 13 determines whether or not the IC card 3 has responded to the radio waves of which the transmission has been started in step S1. If the result of the determination is affirmative in step S2, the process of step S5 described later is performed. If, on the other hand, the result of the determination is negative in step S2, the process of step S3 is performed.

In step S3, the CPU 13 determines whether or not the IC card 3 has been sensed in the previous sensing process. It should be noted that the previous sensing process refers to the process of step S2 performed one time before the process of step S2 in which the result of the determination has been negative this time (i.e., performed one time before the process of step S2 performed immediately before step S3). The determination process in step S3 is the process of determining whether or not the state where the IC card 3 is sensed has changed to the state where the IC card 3 is not sensed. If the result of the determination is affirmative in step S3, the process of step S4 is performed. If, on the other hand, the result of the determination is negative in step S3, the process of step S2 is performed again. Thus, if the IC card 3 has not been sensed, the processes of steps S2 and S3 are repeatedly performed (here, at the first time intervals described above). Thus, in the polling process described above (see FIG. 2), the processes of steps S2 and S3 are repeatedly performed until the IC card 3 is sensed.

In step S4, the CPU 13 notifies the application that the IC card 3 is not sensed. That is, the CPU 13 outputs the absence notification described above to the application. After step S4, the CPU 13 performs the process of step S2.

On the other hand, in step S5, the CPU 13 acquires identification information from the sensed IC card 3. It should be noted that if identification information has been acquired for the first time since the IC card 3 has been newly sensed, the CPU 13 saves the identification information acquired for the first time. That is, the CPU 13 stores, as the identification information data 35 in the memory 14, data of the identification information acquired for the first time.

In step S6, the CPU 13 determines, on the basis of the acquired identification information, whether or not the communication target (IC card) 3 has been changed. The determination in step S6 is made by, for example, the method described in the above "2-2: Determination of Change of Communication Target in Confirmation Operation". If the result of the determination is negative in step S6, the process of step S7 is performed. If, on the other hand, the result of the determination is affirmative in step S6, the process of step S11 described later is performed.

In step S7, the CPU 13 determines whether or not an instruction has been given by the application. Here, in the exemplary embodiment, the application program 32 is executed by the CPU 13 independently of (in parallel with) the series of processes shown in FIG. 7. If an instruction has been given in the information processing performed by the application program 32, the CPU 13 stores in the memory 14 the instruction data 36 indicating the instruction. That is, if an instruction has been given before or during the series of processes shown in FIG. 7, the instruction data 36 is stored in the memory 14. Thus, the determination in step S7 is made on the basis of whether or not the instruction data 36 is stored in the memory 14. If the result of the determination is affirmative in step S7, the process of step S8 is performed. If, on the other hand, the result of the determination is negative in step S7, the process of step S8 is skipped, and the process of step S9 described later is performed.

In step S8, the CPU 13 performs the data communication process described above in accordance with the instruction from the application. Any specific operation may be performed in the data communication process. In the exemplary embodiment, data to be written to the IC card 3 by the information processing apparatus 2 is stored as the communication data 37 in the memory 14 in the information processing performed by the application program 32. Thus, to write data to the IC card 3, the CPU 13 reads the communication data 37 from the memory 14 and transmits the communication data 37 to the IC card 3, using the communication section 11. Further, the data read from the IC card 3 by the information processing apparatus 2 is stored as the communication data 37 in the memory 14. When the data read from the IC card 3 is used in the application, the CPU 13 reads at appropriate timing the communication data 37 stored in the memory 14. In the above step S8, when the data communication process corresponding to the instruction from the application has ended, the process of step S9 subsequent to step S8 is performed. At this time, the instruction data 36 corresponding to the completed instruction is deleted from the memory 14.

In step S9, the CPU 13 stops the transmission of radio waves from the communication section 11. That is, the CPU 13 commands the communication chip 12 to stop the transmission of radio waves. In the subsequent step S10, the CPU 13 waits a predetermined time. The predetermined time is the time from the performance of the confirmation operation to the next performance of the confirmation operation, and corresponds to each of the second time intervals described above. When the predetermined time has elapsed since the start of step S10, the process of step S1 is performed subsequently to step S10.

On the other hand, in step S11, the CPU 13 notifies the application that the IC card 3 has been changed. That is, the CPU 13 outputs the change notification described above to the application. In the subsequent step S12, the CPU 13 changes the saved identification information. That is, the CPU 13 stores, as new identification information data 35 in the memory 14, data indicating the identification information acquired in step S5 performed immediately before step S12. In the exemplary embodiment, the identification information of the IC card after a change is thus saved, thereby enabling the information processing apparatus 2 to communicate also with the IC card after the change.

Based on the series of processes shown in FIG. 7 described above, the processes of steps S1, S2, S5, S6, S7, S9, and S10 are repeatedly performed in this order, thereby performing the intermittent confirmation operation (the transmission of radio waves) as shown in FIG. 2. Further, if the IC card 3 has disappeared while the intermittent confirmation operation is performed, the result of the determination is negative in step S2. Consequently, the processes of steps S3 and S4 are performed. That is, the absence notification is output to the application. Further, if the IC card 3 has been changed while the intermittent confirmation operation is performed, the result of the determination is affirmative in step S6. Consequently, the process of step S11 is performed, and the change notification is output to the application. If an instruction has been given again by the application while the intermittent confirmation operation is performed, the result of the determination is affirmative in step S7. Consequently, the data communication process is performed in step S8. As described above, the operation described in the above "2. Overview of Operation of Communication System" is performed by the series of processes shown in FIG. 7.

As described above, the exemplary embodiment can be used as, for example, a portable device that performs near field communication with an IC card, a communication program to be executed by a portable device, and the like in order, for example, to reduce the power consumption when communication is performed.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a communication program to be executed by a computer of an information processing apparatus having a communication section configured to perform near field communication, the communication program causing the computer to execute:
   performing data communication with a communication target present near the communication section, using the communication section;
   after the data communication, confirming presence of the communication target having performed the data communication by causing the communication section to intermittently transmit radio waves; and
   if the presence of the communication target near the communication section has been confirmed, acquiring identification information of the communication target from the communication target, and determining, using the acquired identification information, whether or not the communication target having performed the data communication has been changed.

2. The non-transitory computer-readable storage medium according to claim 1, wherein
   while a result of the determination is negative, the radio waves for confirming the presence of the communication target having performed the data communication continue to be intermittently transmitted.

3. The non-transitory computer-readable storage medium according to claim 1, the communication program further causing the computer to execute
   if a result of the determination is affirmative, notifying an application executed by the information processing apparatus that the communication target having performed the data communication has been changed.

4. The non-transitory computer-readable storage medium according to claim 1, wherein
   in response to the fact that the data communication between the information processing apparatus and the communication target present near the communication section has ended, radio waves for the data communication are temporarily stopped regardless of whether or not the communication target having performed the data communication is present at a position where the communication target can communicate with the information processing apparatus.

5. The non-transitory computer-readable storage medium according to claim 4, wherein
   after the radio waves for the data communication have been temporarily stopped, the communication section intermittently transmits the radio waves for confirming the presence of the communication target having performed the data communication.

6. The non-transitory computer-readable storage medium according to claim 4, wherein
   as the data communication, data is read from and/or written to the communication target present near the communication section; and
   after the reading and/or the writing of the data has ended, an operation of intermittently transmitting the radio waves is started.

7. The non-transitory computer-readable storage medium according to claim 1, wherein
   in accordance with an instruction from an application executed by the information processing apparatus, data communication with the communication target present near the communication section is performed; and
   an operation of intermittently transmitting the radio waves is started regardless of the instruction from the application.

8. The non-transitory computer-readable storage medium according to claim 7, wherein
   if the instruction has been given by the application during the operation of intermittently transmitting the radio waves, the transmission operation is stopped; and
   in response to the stoppage of the transmission operation and in accordance with the instruction from the application, data communication is performed anew with the communication target having performed the data communication.

9. The non-transitory computer-readable storage medium according to claim 7, the communication program further causing the computer to execute
   if the presence of the communication target has not been confirmed, notifying the application that the communication target has disappeared.

10. The non-transitory computer-readable storage medium according to claim 9, wherein
    the application is not notified of connection and disconnection of communication caused by the operation of intermittently transmitting the radio waves.

11. The non-transitory computer-readable storage medium according to claim 1, the communication program further causing the computer to execute
    sensing the presence or absence of the communication target present near the communication section at first time intervals, using the radio waves, wherein
    if the communication target has been sensed, data communication is performed with the sensed communication target; and
    the communication section transmits the radio waves at second time intervals different from the first time intervals after the data communication.

12. An information processing apparatus comprising:
    an antenna capable of performing near field communication;
    a data communication section configured to perform data communication with a communication target present near the antenna, using the antenna;
    a confirmation section configured to, after the data communication, confirm presence of the communication target having performed the data communication by causing the antenna to intermittently transmit radio waves; and
    an acquisition and determination section configured to, if the presence of the communication target near the communication section has been confirmed, acquire identification information of the communication target from the communication target, and determine, using the acquired identification information, whether or not the communication target having performed the data communication has been changed.

13. A communication system including an information processing apparatus having an antenna and a communication target for performing near field communication with the information processing apparatus,
    the information processing apparatus comprising:
    a data communication section configured to perform data communication with the communication target present near the antenna, using the antenna;
    a confirmation section configured to, after the data communication, confirm presence of the communication target having performed the data communication by causing the antenna to intermittently transmit radio waves; and an acquisition and determination section configured to, if the presence of the communication target near the communication section has been confirmed, acquire identification information of the communication target from the communication target, and determine, using the acquired identification information, whether or not the communication target having performed the data communication has been changed.

14. A communication method to be performed by an information processing apparatus having a communication section configured to perform near field communication, the communication method comprising:

performing data communication with a communication target present near the communication section, using the communication section;

after the data communication, confirming presence of the communication target having performed the data communication by causing the communication section to intermittently transmit radio waves; and if the presence of the communication target near the communication section has been confirmed, acquiring identification information of the communication target from the communication target, and determining, using the acquired identification information, whether or not the communication target having performed the data communication has been changed.

* * * * *